May 8, 1951  C. H. LITTLE ET AL  2,552,335
COUNTERPOISE MECHANISM FOR DRAFTING MACHINES
Filed Sept. 22, 1944  6 Sheets-Sheet 2

INVENTORS
CHARLES HENRY LITTLE
BY CHARLES HUBBARD LITTLE
Kwis Hudson Boughton & Williams
ATTORNEYS INVENTORS
CHARLES HENRY LITTLE
BY CHARLES HUBBARD LITTLE
Kwis Hudson Boughton & Williams
ATTORNEYS May 8, 1951 C. H. LITTLE ET AL 2,552,335
COUNTERPOISE MECHANISM FOR DRAFTING MACHINES
Filed Sept. 22, 1944 6 Sheets-Sheet 4

INVENTORS
CHARLES HENRY LITTLE
BY CHARLES HUBBARD LITTLE
Kwis Hudson Boughton & Williams
ATTORNEYS May 8, 1951 C. H. LITTLE ET AL 2,552,335
COUNTERPOISE MECHANISM FOR DRAFTING MACHINES
Filed Sept. 22, 1944 6 Sheets-Sheet 5

INVENTORS
CHARLES HENRY LITTLE
BY CHARLES HUBBARD LITTLE
Kwis Hudson Boughton & Williams
ATTORNEYS May 8, 1951 C. H. LITTLE ET AL 2,552,335
COUNTERPOISE MECHANISM FOR DRAFTING MACHINES
Filed Sept. 22, 1944 6 Sheets-Sheet 6
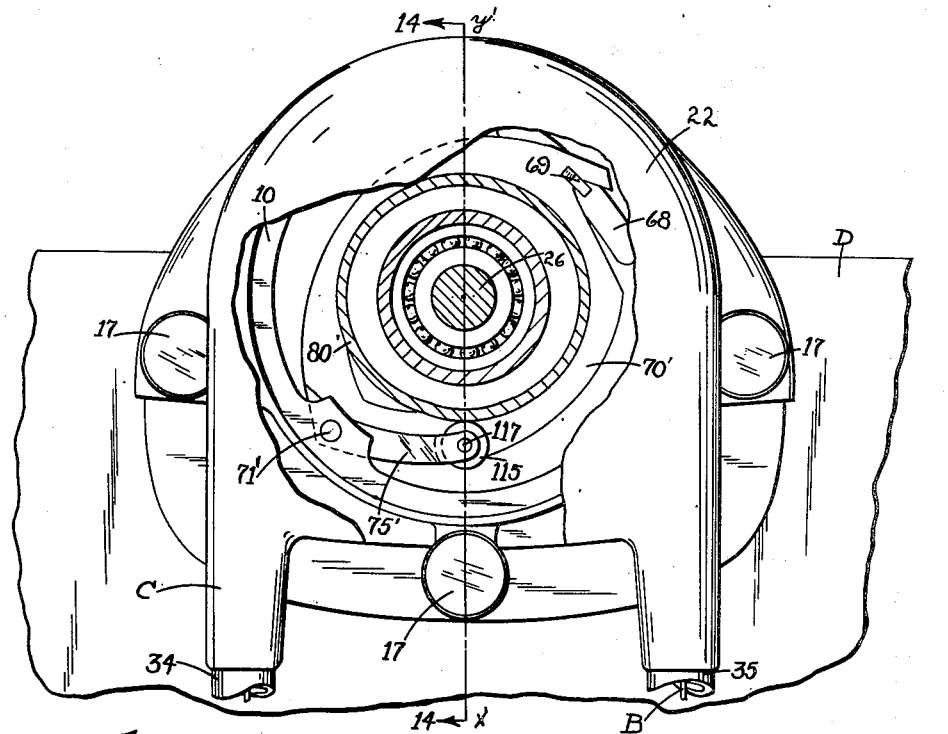
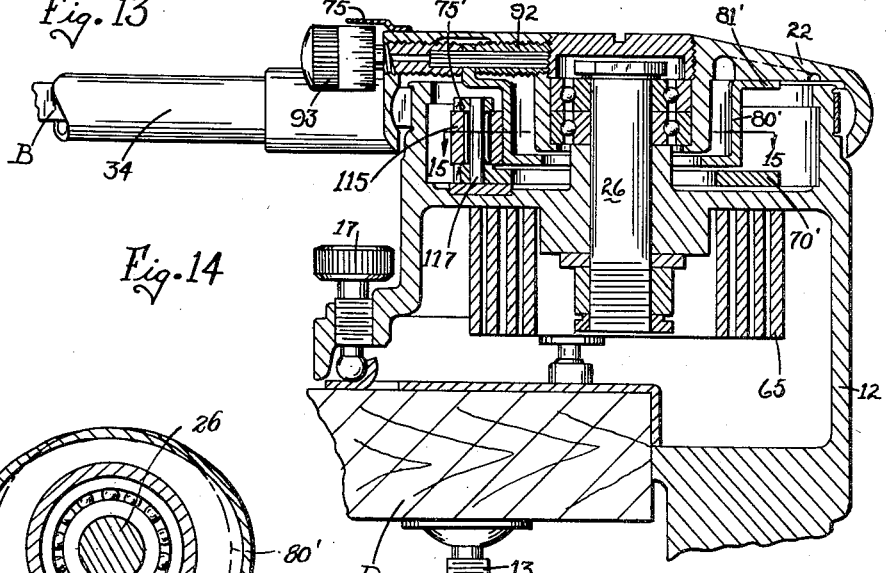
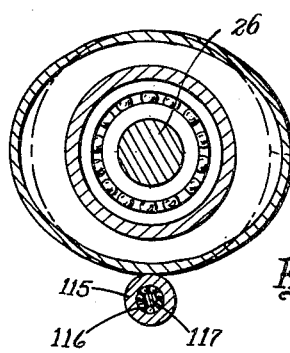
INVENTORS
CHARLES HENRY LITTLE
BY CHARLES HUBBARD LITTLE
Kwis Hudson Boughton & Williams
ATTORNEYS Patented May 8, 1951

2,552,335

UNITED STATES PATENT OFFICE 2,552,335

COUNTERPOISE MECHANISM FOR DRAFTING MACHINES

Charles Henry Little, Cleveland Heights, and Charles Hubbard Little, Cleveland, Ohio; Nan Hubbard Little, executrix of said Charles Henry Little, deceased, assignors, by direct and mesne assignments, to Universal Drafting Machine Corporation, Cleveland, Ohio, a corporation of Ohio Application September 22, 1944, Serial No. 555,267

18 Claims. (Cl. 33—79)

The present invention relates to drafting machines and similar devices comprising a parallel motion mechanism or arm, one end of which is adapted to be secured to a table, drafting board or like device affording a working surface, over which the other end of the arm, provided with some suitable drafting instrument or the like, is adapted to be moved and the instrument carried thereby maintained parallel in successive positions. Usually the parallel motion arm comprises two relatively movable sections and the free end of the arm will not remain in any predetermined position without being held therein if the working surface is inclined at any substantial angle unless counterbalanced at least to some extent. Parallel motion mechanisms are generally considered to be either of the so-called "parallelogram" type or of the so-called "wheel and band" type, depending upon whether the section or sections thereof are essentially members arranged in parallelogram fashion and pivoted together adjacent to the corners, or wheels held in spaced relation by strut-like members and encircled by a band or bands which maintain a predetermined angular relationship therebetween.

One of the principal objects of the invention is the provision of a novel and improved drafting machine or the like comprising counterpoise mechanism for one or more sections of the parallel motion arm and so constructed and arranged as not to materially change the general appearance of the machine.

Another object of the invention is the provision of a novel and improved drafting machine or the like comprising counterpoise mechanism for one or more sections of the parallel motion arm enclosed within the machine and so constructed and arranged as not to detract from the appearance thereof.

Another object of the invention is the provision of a novel and improved drafting machine or the like comprising a reversible parallel motion arm and counterpoise mechanism therefor, which counterpoise mechanism will not impose any limitations upon the normal capacities of the machine and is so constructed and arranged that it is operative in all positions of the arm including the "reverse" position.

Another object of the invention is the provision of a novel and improved drafting machine or the like comprising a torsional or coil contractional spring actuated counterpoise mechanism for one or more sections of the parallel motion arm having the counterpoise spring enclosed within the machine and so arranged as not to detract from the appearance thereof.

Another object of the invention is the provision of a novel and improved drafting machine or the like comprising spring actuated counterpoise mechanism for one or more sections of the parallel motion arm and including readily accessible means independent of said spring for varying the counterpoising effect of the spring to balance the arm at different board angles.

Another object of the invention is the provision of a novel and improved drafting machine or the like comprising counterpoise mechanism for one or more sections of the parallel motion arm and means for adjusting the counterpoise mechanism to balance the arm at different board angles, in combination with means for indicating the board angle for which the counterpoise mechanism is adjusted or set.

Another object of the invention is the provision of a novel and improved drafting machine or the like comprising counterpoise mechanism for one or more sections of the parallel motion arm, which counterpoise mechanism includes a readily accessible, manually adjustable eccentric or substantially eccentric cam for varying the counterpoise effect thereof.

Another object of the invention is the provision of a novel and improved drafting machine or the like comprising counterpoise mechanism for one or more sections of the parallel motion arm, which counterpoise mechanism includes a ball bearing or anti-friction eccentric cam.

Another object of the invention is the provision of a novel and improved drafting machine or the like comprising spring actuated counterpoise mechanism for one or more sections of the parallel motion arm, which counterpoise mechanism includes an eccentric or substantially eccentric cam and a lever interposed between the counterpoise spring and cam for changing the direction and/or amount of the force of the spring applied to the cam.

Another object of the invention is the provision of a novel and improved drafting machine or the like of the character referred to comprising a parallel motion arm including two sections pivotally connected together and having means located at the elbow or joint of the arm for counterbalancing the lower or protractor section thereof.

The invention resides in certain constructions and combinations and arrangements of parts and further objects and advantages will be apparent to those skilled in the art to which the invention relates from the following description of the preferred embodiment described with reference to the accompanying drawings forming a part of this specification in which similar reference characters designate corresponding parts, and in which Fig. 1 is a plan view of a drafting machine embodying the present invention;

Fig. 10 is a fragmentary plan view of a portion of the drafting machine shown in Fig. 1;

Fig. 11 is a sectional view, with portions in elevation, approximately on the line 11—11, Fig. 10;

Fig. 12 is a fragmentary view of the band employed in the drafting machine shown in Fig. 1;

Fig. 13 is a view similar to Fig. 2 but showing a modified construction;

Fig. 14 is a sectional view, with portions in elevation, approximately on the line 14—14 of Fig. 13; and Fig. 15 is a detached sectional view, with portions in elevation, approximately on the line 15—15 of Fig. 14, of the cam and roller portion of the counterpoise mechanism.

Figure 1:
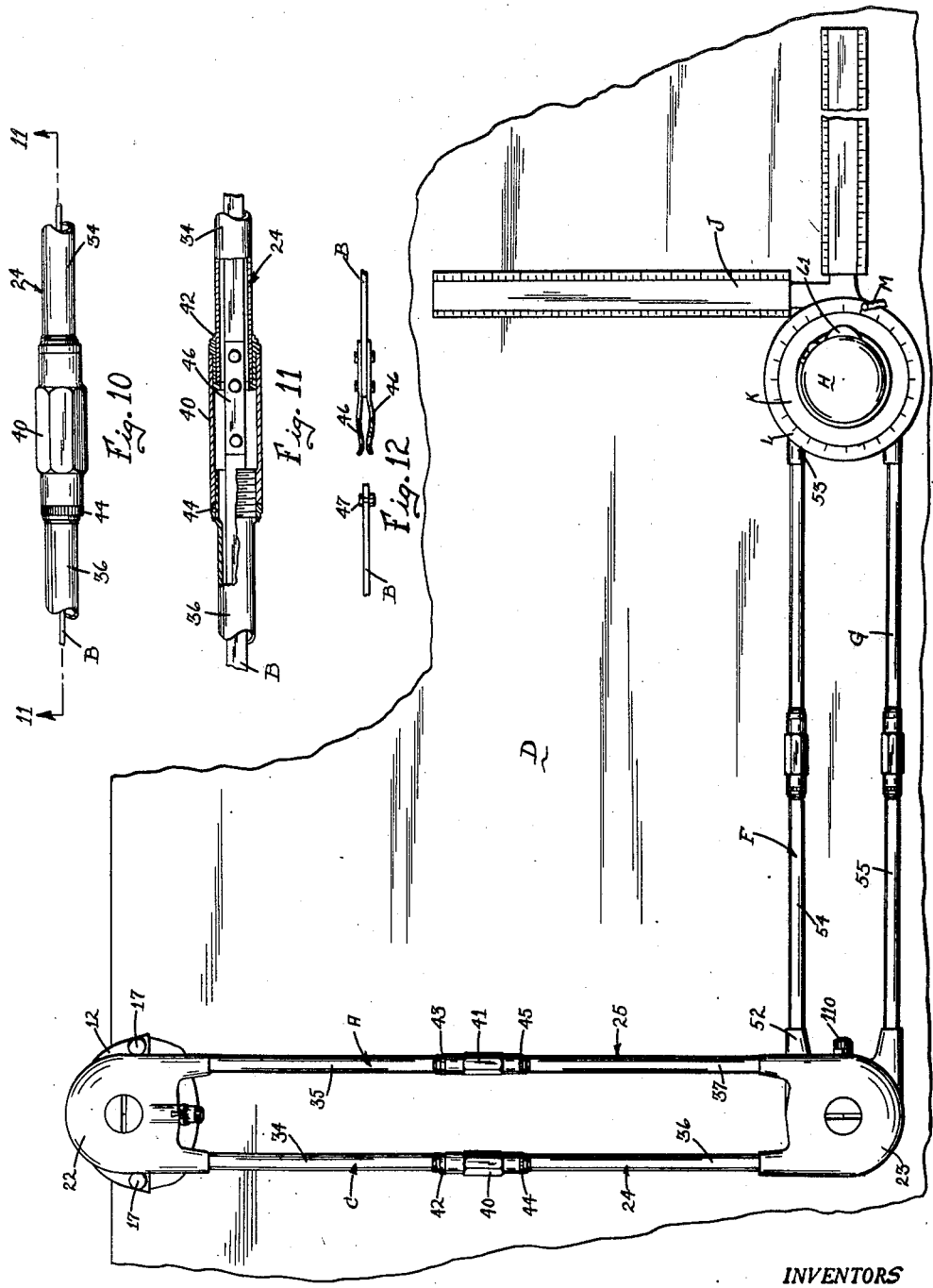

Referring to the drawings, the drafting machine shown therein comprises a two-section parallel motion mechanism or arm of the wheel and band type having one end detachably connected to a drawing board and the other or free end provided with a protractor head adapted to be moved about the drawing board. The parallel motion mechanism or arm comprises two angularly movable sections, each comprising a pair of wheels of equal diameter encircled by a flexible band, which wheels are held in spaced relation by a strut or strut member enclosing the same and the bands. In addition, the drafting machine shown comprises counterpoise mechanism for both sections of the parallel motion arm.

Figure 2:
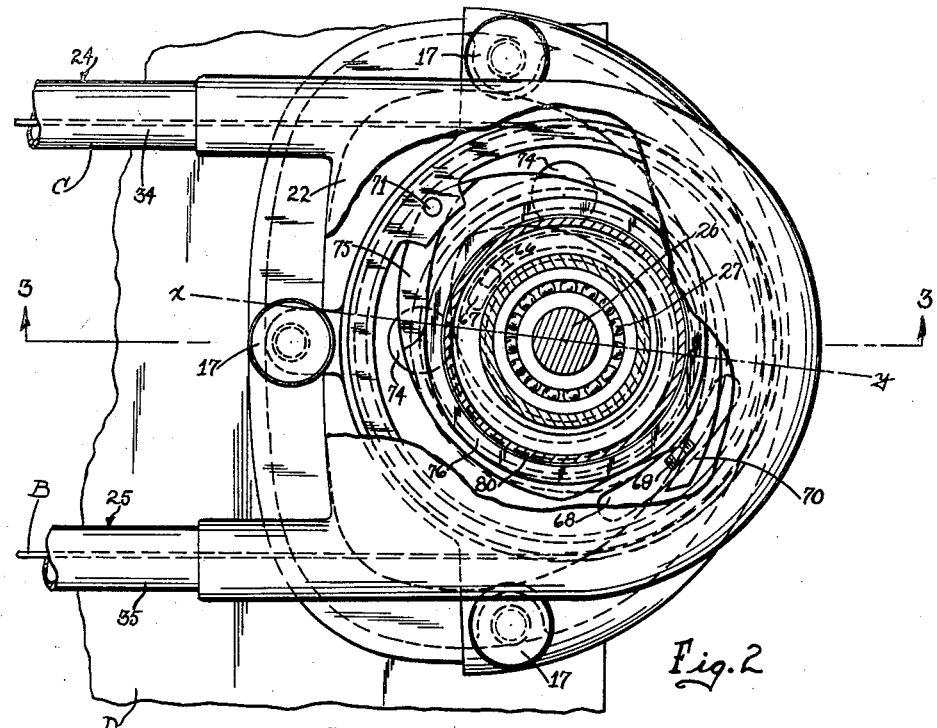
Fig. 2 is an enlarged plan view of the anchor portion of the drafting machine shown in Fig. 1, with portions broken away and shown in section, approximately on the line 2—2 of Fig. 3.

The upper or anchor section A of the parallel motion arm comprises wheels 10 and 11 encircled by an endless band B. The wheels 10 and 11 are held in spaced relation by an expandable strut C pivotally connected thereto in a manner hereinafter described. The upper wheel 10 at the anchor end of the upper or anchor section A, as shown, is formed integral with a bracket 12 forming a part of the anchor for the arm, which bracket is adapted to engage over the upper edge of a drafting board or the like D and be detachably fixed thereto by a pair of clamp screws 13 threaded into suitably tapped apertures in the ends of projecting arms 14 formed integral with the bracket 12. The upper end of each of the clamp screws 13 is provided with a board-engaging member 15 connected thereto by loose joints which permit the member 15 to seat properly on the underside of the board. The upper surface of the drawing board is engaged by a member 16 connected to and carried by the lower ends of three disaligned adjusting screws 17 threaded into suitably tapped apertures in the bracket 12. The lower ends of the screws 17 are spherically-shaped and the board-engaging member 16 is detachably secured thereto by cut-out portions 18 of the member 16, which engage around the lower spherical ends of the screws 17. The adjusting screws 17 are triangularly arranged as shown in Fig. 2 of the drawings and provide an adjustment of the parallel motion arm in two directions at right angles to each other. As an alternative construction, one of the screws 17 can be replaced by a fixed pin. The construction is such that the plane of the parallel motion arm can be adjusted to the plane of the working surface of the drawing board in a universal manner by manipulation of the clamp and adjusting screws 13 and 17, respectively. In the construction shown the location of the bracket 12 with respect to the upper or rear edge of the drafting board is determined by a finished surface 20 on the bracket 12 adapted to engage the rear edge of the drawing board. A downwardly projecting flange 21 formed on the member 16 encloses a portion of the rear edge of the board adjacent to the anchor.

The anchor strut C comprises yokes or yoke portions or members 22, 23 connected together and held in spaced relation with respect to each other by tubular side portions or members 24, 25. The upper yoke 22 at the anchor end of the section is pivotally connected to a bolt or pin 26 by a pair of anti-friction bearings 27, 28, which pin 26 is fixed in a boss 29 formed integral with a web 30 of the anchor bracket 12. As shown, the pin 26 is held in position by suitable jamb nuts threaded onto the lower end and the head of the pin is enclosed by a member 31 threaded into a tapped aperture in the center of the yoke 22. The construction is such that the anchor strut C is supported for rotation about the center of the wheel 10 as an axis. The lower yoke 23 is pivotally connected to the wheel member E at the elbow of the arm for rotation about the center of the wheel 11 as an axis by a bolt or pin 32 to which it is connected by anti-friction bearings 33.

The strut C is expandable or adjustable in length and separable intermediate the yokes 22, 23 to facilitate assembly and replacement of the band B and for the purpose of tensing the same, etc. To this end the side members 24, 25 comprise tubular sections 34, 35 and 36, 37 fixedly secured to or formed integral with suitable bosses forming a part of the yokes 22, 23, respectively. The adjacent ends of the tubular sections 34, 36 and 35, 37 are normally held in spaced relation with respect to each other and are operatively connected together by tubular nut-like members 40, 41, respectively, the upper ends of which are adapted to engage against shoulders formed on members 42, 43 fixed to the lower ends of the tubular sections 34, 35, respectively, while the other ends thereof are threaded upon the enlarged upper ends of the tubular sections 36, 37. The fact that the ends of the members 36, 37 upon which the members 40, 41 are threaded are enlarged, permits the members 40, 41 to be retracted over the tubular sections by rotating the former in a direction to move them to the left as shown in Figs. 10 and 11 until the threads are disengaged and thereafter the tubular nut members will slide freely on the tubular sections. The tubular nut-like members 40, 41 are normally held in position by jamb nuts 44, 45, respectively.

From the construction described above, it will be apparent that the length of the strut C can be varied by adjusting or rotating the tubular nut-like members 40, 41 after first loosening the jamb nuts 44, 45, and that when the nut-like members 40, 41 are retracted from their normal position, the flexible band B will be loose on the wheels 10 and 11 with a considerable portion thereof exposed, thus facilitating assembly or replacement of the band. Since the side members 24, 25 are of tubular form, the band B must be threaded through the strut and about the wheels and is, therefore, made separable at one point. As shown in Figs. 11 and 12, one end of the band B is provided with two spring members or arms 46 located at opposite sides of the band proper and riveted thereto. The free ends of the arms 46 normally receive the other end of the band proper which has a small rivet or pin 47 extending therethrough, the projecting portions of which engage within suitable apertures formed in the ends of the members 46. The construction affords a simple and convenient means for hooking the ends of the band together and produces a band one end of which is extremely flexible and of minimum thickness, thus reducing to a minimum the clearance necessary between the wheels and yokes to thread the band about the wheels. Obviously a band of any suitable construction may be employed.

The protractor section F of the parallel motion arm is similar in construction and will not be described in detail. It comprises a pair of equal diameter wheels 50 and 51 encircled by a band B' similar in construction to the band B previously described and held in spaced relation by a strut G comprising yokes 52, 53 located at the elbow and drafting or protractor head, respectively, of the drafting machine and held apart by side members 54, 55 similar in construction to the side members 24, 25 previously described. The elbow constitutes the anchor for the protractor section F of the arm and the wheel 50 at the elbow of the parallel motion arm or at the anchor end of the section F is formed integral with the lower portion of the wheel member E and the wheel 51 at the drafting head is formed integral with the holding ring 56 of the drafting or protractor head. The yoke 52 of the protractor strut G is supported by an anti-friction bearing 57 for rotation about the lower end of the bolt or pin 32 and the wheel 51 rotatably supported by an anti-friction bearing 58 in the yoke 53.

The parallel motion mechanism proper shown and described above is claimed in our copending application Serial No. 631,334, filed November 28, 1945, which application is a division of the present application.

The protractor or drafting head shown and referred to generally by the reference character H is shown and described in detail in our copending application Serial No. 555,268, filed September 22, 1944, entitled Drafting Machine, now abandoned, to which application reference is made for a complete description thereof.

Broadly the protractor or drafting head H comprises a ruler assembly J including the normally rotatable element K of the protractor proper, which element is hereinafter referred to as the "rotatable protractor element," and one or more rulers 59. In addition, the protractor head comprises a normally stationary protractor element L, herein referred to as the "stationary protractor element" or "stationary protractor element assembly," which stationary protractor element cooperates with the rotatable protractor element to indicate the angular position of the ruler or rulers with respect to some given base or reference line. The ruler assembly J is rotatably supported by double anti-friction bearings 60 in the hub member of the stationary protractor element assembly L, which assembly is adjustably secured to the holding ring 56 by a manually operable clamp M. The ruler assembly J is adapted to be indexed relative to the stationary protractor element assembly L by an index mechanism N located, except for the projecting part of the thumb piece 61 within and underneath the hand knob 62 also forming a part of the ruler assembly. As shown the stationary protractor element L is provided with a graduated circle and the rotatable protractor element with a reference or "zero" line or vernier. Alternatively the graduated circle may be placed on the rotatable protractor element and the vernier on the stationary protractor element, etc. Alternatively any desired appropriate type of drafting or protractor head may be employed with the improved parallel motion mechanism or arm of the present invention.

As previously stated, the parallel motion arm of the drafting machine disclosed comprises counterpoise mechanism enclosed within the arm and arranged in such a manner that it does not change the shape of the arm or detract from its appearance. The counterpoise mechanism is employed to counterbalance the weight of the parallel motion arm, etc., when the devce is employed on an inclined working or drawing surface. The greater the inclination of the working surface, the greater will be the required counterbalancing force and the counterpoise mechanism disclosed includes means for adjusting the same for different board angles and for indicating the board angle for which the mechanism is set or adjusted.

Figure 3:
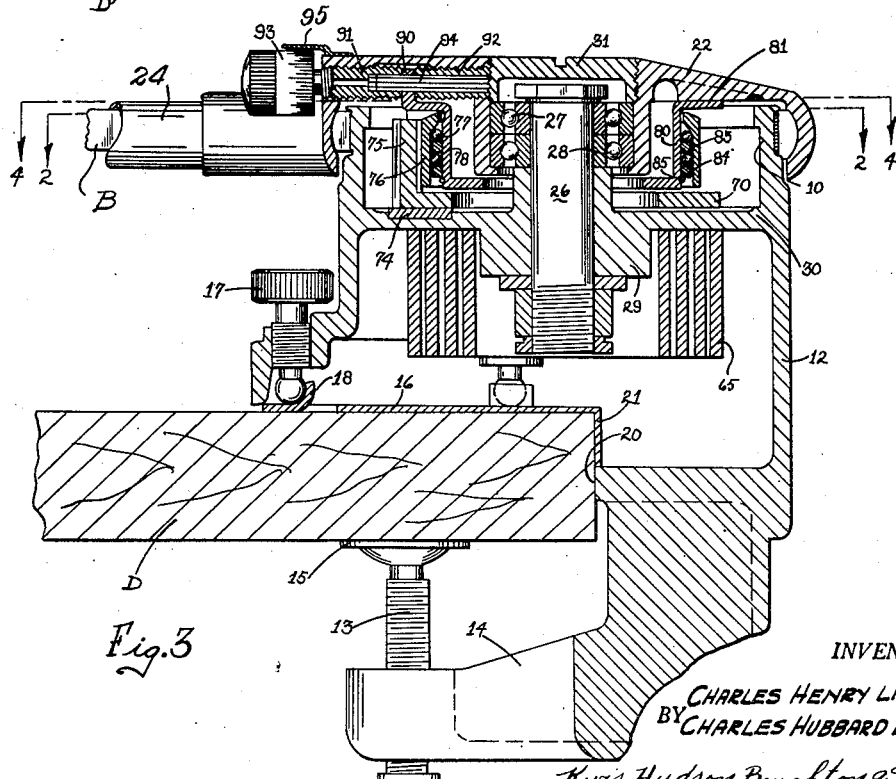
Fig. 3 is a sectional view, with portions in elevation, approximately on the line 3—3 of Fig 2.

Referring particularly to Fig. 3, the counterpoise mechanism for the anchor section A of the parallel motion mechanism comprises a constant pressure torsion or coil type contractional spring 65 located underneath the web 30 of the anchor bracket 12 and wholly enclosed within the bracket. By the word "contractional," we mean a spring which contracts in size or occupies less space as loaded. The spring 65 surrounds the boss 29 on the underside of the web 30 and the inner end of the spring is connected to the web 30 by a hook-like projection 66 extending upwardly through a slot 67 in the web and engaging over the edge thereof and the outer end of the spring extends upwardly through a slot 68 connected by a similar projection 69 to a lever member 70 pivotally connected to the anchor bracket or wheel member 12, at a point diametrically opposite to that at which the spring 65 is connected thereto, by a pin 71 fixed in the bracket or wheel member.

The member 70 rests upon pads 74 located in suitable apertures in the upper surface of the web 30 and includes a portion 75 formed integral therewith which extends above the main portion of the member and engages the outer circumference of a ball bearing eccentric cam or cam assembly comprising an annular bearing member 76 supported by two sets of ball bearings 77, 78 for rotation about a cylindrical portion 80 of a member, designated generally by the reference character 81. The ball bearings 77, 78 are held in position intermediate the bearing member 76 and the member 81 by an internal flange at the top of the member 76 and by spacer rings 83 and 84 interposed between the sets of balls and underneath the bottom set, respectively. The ring 84 is held in position by a spring ring 85 which fits into a groove in the member 81.

The member 81 is pivotally connected to the yoke 22 by a headed pin 86 and opposite the pin or pivot 86, it is provided with an arcuate slot 87 through which the shank of a headed pin or member 88 projects. The pin 88 is fixed in the yoke member 22 and assists in securing the cam member 81 thereto. The cam member 81 includes an upstanding flange 90 spaced 90° from its pivot 86, which flange engages between two threaded portions 91, 92 of an adjusting screw 93 threaded in a suitable aperture formed in the yoke 22 and adapted to adjust the member 81 lengthwise of the strut. The threaded portions of the screw 93 are keyed together by a splined or hexagonal shaft 94 and turn as a unit. The construction is such that the center of the cylindrical portion 80 of the member 81 or the center of the eccentric cam can be adjusted with respect to the center of the wheel 10 by turning the thumb screw 93, thus increasing or decreasing the eccentricity of the portion 80 of the member 81 with respect to the wheel and increasing or decreasing, respectively, the effect of the counterpoise spring 65.

The torsion spring 65 which is relatively long and powerful and pre-loaded at the time of assembly acts through the member 70 and the portion 75 thereof against the bearing member 76 of the cam with the pressure being applied along a line $x-y$ connecting the point of engagement of the portion 75 of the lever 70 with the bearing member 76 and the center of the cylindrical portion 80 of the member 81. Since the angular position of the pivot 71 for the member 70 with respect to the center of the wheel 10 remains constant, the lever 75 exerts a force in an upward direction substantially at right angles to the upper edge of the drawing board at all times. As the strut C of the anchor section A of the parallel motion arm is rotated about the center of the weel 10 as a pivot, the center of the cylindrical portion 80 of the member 81 and of the cam is rotated about the center of the wheel. As the center of the cylindrical portion 80 of the member 81 moves from its normal position approximately in line with the point of contact of the end of the member 75 with the bearing member 76 and the center of the wheel 10, a force is exerted upon the bearing member and through the member 81 upon the strut C counterbalancing the weight thereof. The further the strut C is moved out of a position at right angles to the upper edge of the drawing board, the greater will be the displacement of the center of the eccentric cam from a line connecting the point of contact between the member 75 and the member 76 and the center of the wheel and the greater will be the counterbalancing force to compensate for the increased weight.

The lever 70 changes the direction and the amount of the force exerted by the spring 65 on the eccentric cam. In the present instance, the amount of force is increased, thus permitting the use of a lighter spring, other conditions remaining the same, and the direction in which the force is exerted is varied so that the spring 65 can be connected to the lever 70 a maximum distance from the pivot 71 without extending the lever beyond the wheel. Generally speaking, the force exerted by the spring 65 upon the cam is in the direction of the upper edge of the drawing board and at substantially right angles to it, and the moment arm is a function of the displacement of the center of the cam, that is, the center of the cylindrical portion 80 of the member 81 from a line at right angles to the upper edge of the drawing board through the center of the wheel. The screw 93 provides means for adjusting the center of the cylindrical section 80 of the member 81 with respect to the center of the wheel 10 so as to produce a greater or lesser counterbalancing effect depending upon the angle that the surface of the drawing board makes with the horizontal. To facilitate adjusting the counterpoise mechanism for different board angles, the screw 93 is provided with graduations which cooperate with a pointer 95 fixed to the yoke member 22 to indicate the board angle for which the device is adjusted. Since the screw 93, as shown, makes more than one revolution for the full adjustment of the eccentric cam, the pointer 95 is graduated to indicate the number of revolutions of the screw from the position occupied by it when the center of the cam and the center of the wheel are eccentric.

Figure 4:
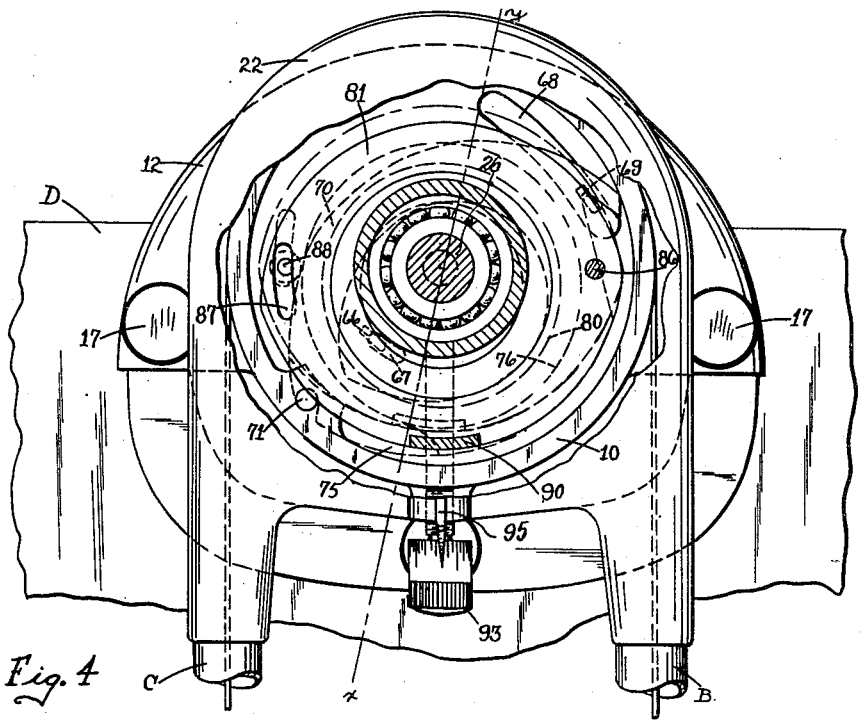
Fig. 4 is a view similar to Fig. 2 but showing the parts in a different operative position and with portions broken away and shown in section, approximately on the line 4—4 of Fig. 3.
Figure 5:
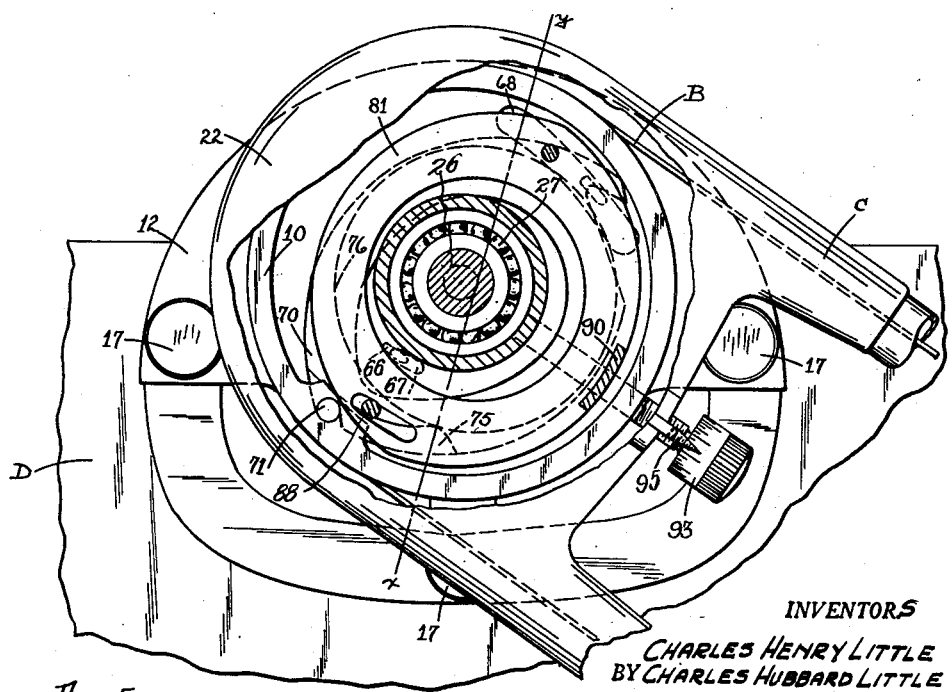
Fig. 5 is a view similar to Fig. 4 but showing the parts in a different operative position.

The relative positions that the various parts assume when the center of the cylindrical portion 80 of the member 81 or, in other words, when the center of the cam coincides with the center of the wheel 10 are shown in Fig. 2. This is the preferred adjustment for working on a horizontal surface when no counterbalancing effect is desired. In Fig. 4, the mechanism is shown adjusted for operation upon an inclined board, with the anchor section of the arm extending at right angles to the top or rear edge of the drawing board, herein referred to as the normal position. The relative positions which the various parts assume as the anchor section of the arm is moved to the right of its normal position are shown in Fig. 5. It will be noted that as the section is moved from its normal position, generally speaking the line of force $x-y$ moves further and further away from the center of the wheel 10 and reaches a maximum when the section is about parallel with the upper or rear edge of the drawing board. The counterpoise mechanism imposes no limit whatsoever upon the movement of the drafting head, is effective regardless of the direction in which the arm is moved, and for any and every position of the drafting head on the working surface.

In view of the fact that during operation the anchor section of the parallel motion arm is to the left of its normal position, that is on the opposite side to that shown in Fig. 5, the point of contact between the member 75 of the lever 70 and the bearing member 76 is preferably located slightly to the left of the longitudinal center line of the strut, as clearly shown in the drawings where the displacement has been slightly exaggerated for the purposes of illustration. The purpose of displacing the point of contact between the lever and the eccentric cam to the left of the longitudinal center line of the strut is to obtain a maximum moment arm when the anchor section is parallel to the upper edge of the drawing board and extending towards the left. Preferably only an increased moment arm, and not the maximum moment arm, is used. The additional moment arm obtained in this respect is at the expense of the moment arm present when the arm is reversed, that is, when the anchor section is substantially parallel with the upper edge of the drawing board but to the right of the anchor, but since in practice the arm is seldom reversed, the loss of moment arm in this direction is not so material.

The counterpoise spring 65, as previously stated, is pre-loaded during assembly and is preferably reduced by said pre-loading to approximately half its normal size. This together with the fact that the spring moves very little during operation results in a space saving, compact construction and a substantially constant relatively high spring pressure or force being applied to the cam assembly or bearing member at all times. Because of the small movement of the spring during operation, the likelihood of breakage is reduced to a minimum and, in any event, the spring is wholly enclosed and if it should break, cannot result in injury to the operator or other persons in the vicinity. It is also to be noted that with the present construction, the counterpoise adjustment effected by rotation of the screw 93 is independent of the spring; in other words, the pressure of the spring remains substantially constant regardless of the adjustment of the cam assembly.

One of the principal advantages of the present adjustable cam construction for varying the counterbalancing effect of the spring to accommodate different board angles is that the entire range of variation or adjustment can be accomplished with comparatively small mechanical elements and with limited movements thereof, for example, in the particular construction shown, the maximum adjustment which can be imparted to the cam member 81 by the adjusting screw 93 is approximately $\frac{3}{16}$" but this is sufficient to take care of all board angles up to approximately 45°. Another advantage of the construction is the fact that the adjustment can be easily made even though the spring pressures employed are relatively high because the spring pressure can be employed to facilitate movement of the cam by properly positioning the parallel motion arm. As an illustration, when the anchor section extends above the upper or rear edge of the drawing board, the lever 75 forces the member 81 towards the adjusting screw.

The lower or protractor section F of the parallel motion arm is counterpoised in a manner similar to that in which the upper or anchor section A is counterpoised by a torsion contractional spring 100 similar to the spring 65 previously referred to but not necessarily so heavy. The spring 100 is located within the upper half of the wheel assembly E at the anchor end of the section or the elbow of the arm and has its inner end connected to the horizontal web 101 in the wheel assembly and its outer or free end connected to a lever member 102 similar to the lever 70. The lever 102 is pivotally connected to the wheel member E by a pin 103 and includes a portion 104, the end of which engages a bearing member 105 of an eccentric cam assembly, which member is rotatably supported by a set of ball bearings 106 for rotation about a cylindrical portion 107 of a member 108 similar to the member 81. The member 108 is pivotally connected to the yoke 52 of the protractor strut G in a manner similar to that in which the member 81 is pivotally connected to the yoke 22 and is adapted to be adjusted to vary the center of the cylindrical portion 107 of the member 108 or, in other words, the center of the ball bearing cam at the anchor end of the section with respect to the center of the wheel 50 by a thumb screw 110 carried by the yoke member 52 similar in construction and operation to the thumb screw 93 and connected to a projection 111 on the member 108 in the same way that the thumb screw 93 is connected to the upstanding projection 90 of the member 81.

Figure 6:
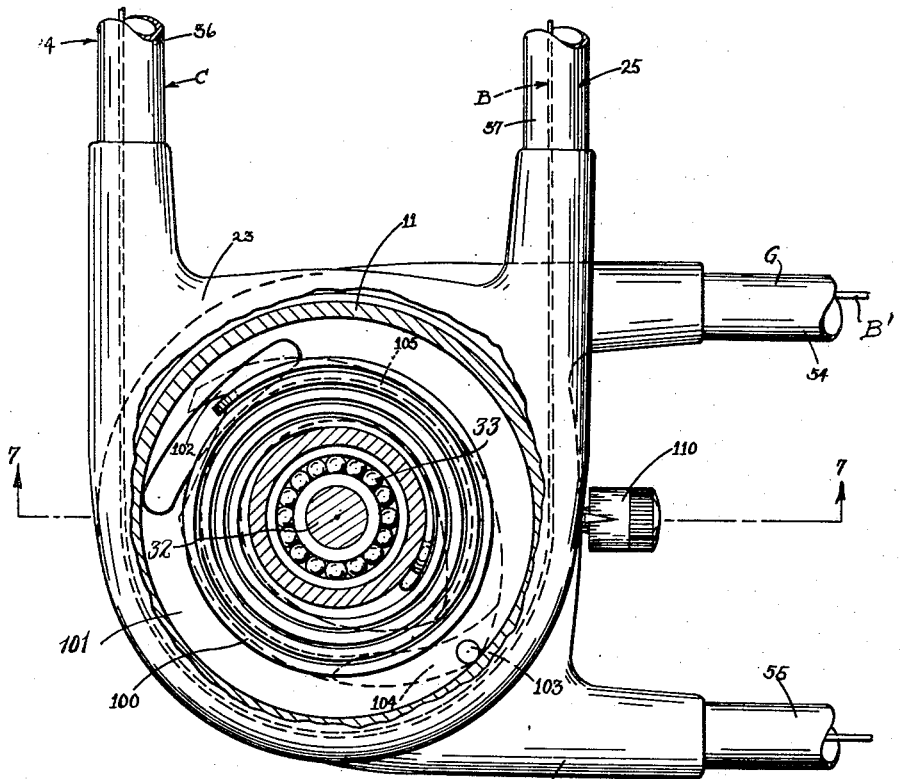
Fig. 6 is an enlarged plan view of the elbow portion of the drafting machine shown in Fig. 1, with portions broken away and shown in section, approximately on the line 6—6 of Fig. 7.
Figure 7:
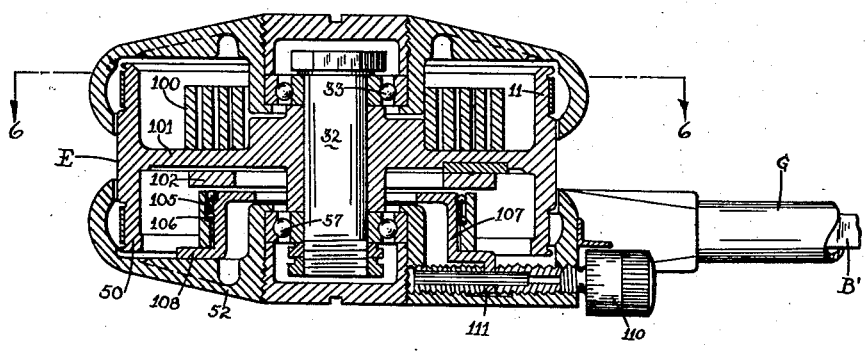
Fig. 7 is a sectional view approximately on the line 7—7 of Fig. 6.
Figure 8:
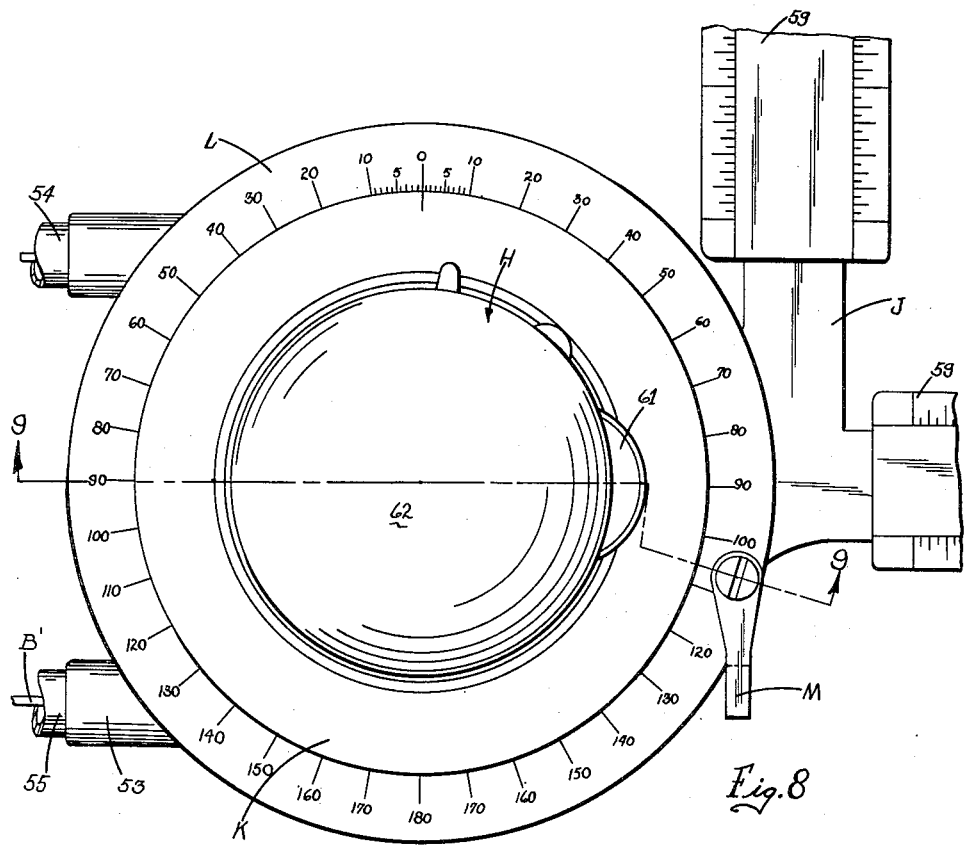
Fig. 8 is an enlarged plan view of the protractor or drafting head portion of the drafting machine shown in Fig. 1.
Figure 9:
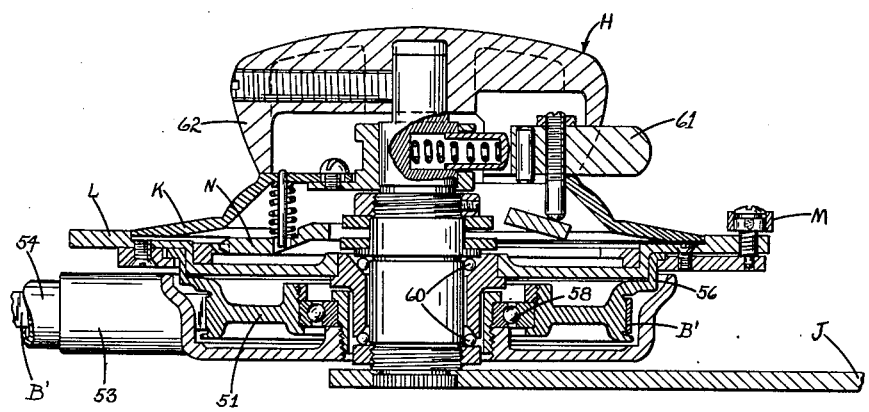
Fig. 9 is a sectional view, with portions in elevation, approximately on the line 9—9 of Fig. 8.

With respect to the protractor strut G, the contact between the lever 104 and the bearing member 105 is offset to the left of the longitudinal center line of the anchor section A when in its normal position as clearly shown in Fig. 6 so as to obtain an increased moment arm when the protractor section of the arm is parallel to the upper or rear edge of the drafting board. In the embodiment shown, the thumb screw 110, like the thumb screw 93, is designed to move the member 108 approximately $\frac{3}{16}$" and the offset of the contact between the lever 104 and the member 105 as shown in Fig. 6 is slightly exaggerated. As is the case with the anchor section, the offset or displacement is preferably slightly less than the maximum adjustment which can be imparted to the cam assembly. While this does not produce the maximum moment arm possible, it is the optimum moment arm considering other facts which must be reckoned with, such as the loss of moment arm when the section is in the opposite position, as previously explained, and the turning force exerted upon the strut or section when it is normal to the upper or rear edge of the drawing board and the ball bearing cam assembly adjusted for a fairly large board angle.

With the construction just described, it is possible to balance the parallel motion arm to within 10% for all normal positions of the protractor or drafting head. Friction, etc., in the mechanism and between the protractor head, including the rollers and the working surface, takes care of the small unbalance and the protractor head remains stationary in any position to which it is moved for board angles as high as approximately 45°. A greater degree of balance can be obtained by the use of a cam which, although substantially eccentric, varies slightly from a true eccentric. In this instance, however, the anti-friction member must be transferred from the cam to the lever interposed therebetween and the counterpoise spring, which transposition interposes certain engineering difficulties, etc., that makes the construction shown in Figs. 1 to 9 the preferred construction.

The alternative construction referred to is illustrated in Figs. 13, 14 and 15 which show the anchor end of a drafting machine similar to that previously described except that the cam employed in the counterpoise mechanism is not a true eccentric cam and the anti-friction member has been transferred to the lever interposed between the cam and the counterpoise spring. While only the counterpoise mechanism for the anchor section of the parallel motion mechanism is shown, it is to be understood that a similar counterpoise construction for counterbalancing the protractor section F may be employed at the elbow of the arm which constitutes the anchor for the protractor section of the arm, that is, the part above which the strut or section pivots.

The parts shown in Figs. 13, 14 and 15, which are duplicates of the parts shown in the preceding figures, are designated by the same reference characters and the corresponding but not duplicate parts designated by the same reference character with a prime mark affixed thereto and the construction shown will not be described in detail. Suffice it to say that the end of the member 75' on the lever 70' corresponding with the lever 70 previously described is provided with a roller 115 rotatably supported by an anti-friction needle bearing 116 upon a pin 117 fixed in the recessed end of the member 75'. The roller 115 engages directly against the cam portion 80' of the cam member 81', the contour of which portion 80' varies slightly from a true eccentric, as is clearly shown in Fig. 15 where the deviation of the contour of the cam from a true circle has been exaggerated for the purpose of illustration.

In the present instance the cam is elliptical in shape with its short axis coinciding with the center line of the strut C and the line of action $x'-y'$ between the roller 115 and the center of the cam coincides with the center line of the strut when the counterpoise mechanism is adjusted for operation at a zero board angle. The loss of moment arm previously referred to, when the counterpoise mechanism is adjusted for operation with a board angle other than zero degrees, is in the present instance taken care of, or compensated for, by the variation or rise in the cam surface, however, it is to be understood that the arrangement of offsetting the pivot for the lever previously described can be employed, if desired, and the errors therein compensated for by variations in the cam. The variation in the spring pressure caused by the movement of the spring during operation, although slight, as previously explained, also can be compensated for by varying the contour of the cam. While the shape of the cam surface is substantially that of a slightly oval circle it can be worked out in practice by the cut-and-try method to where a perfect balance is obtained.

From the foregoing description of the preferred embodiment of the invention, it will be apparent that the objects heretofore enumerated and others have been accomplished and that there has been provided a novel and improved drafting machine or the like comprising a parallel motion mechanism of the wheel and band type which is light in weight, rigid in construction and operation and of limited size and wherein the bands are completely enclosed but can be readily replaced and the tension thereof adjusted as desired. The improved machine also includes an enclosed counterpoise mechanism which does not impose any restrictions upon the movement of the arm, is effective in all positions of the protractor head, and which does not alter the appearance of the device or make it appear bulky and ungainly. The employment of a contractional, torsion or coil spring or springs in the counterpoise mechanism not only reduces the bulk of the device, thus adding to its appearance, but also permits the use of heavy spring pressures as previously described, which heavy spring pressures could not be obtained with the use of other types of springs because the space requirements thereof would be too great.

While the preferred embodiments of the invention have been described with considerable detail, alternative constructions may be employed, as for example, the counterpoise cam may be connected to the wheel member instead of to the strut member and the counterpoise spring and lever connected to the strut member, etc. The invention is not limited to the particular construction shown and described and it is our intention to cover hereby all adaptations, modifications and uses thereof which come within the practice of those skilled in the art to which the invention relates and within the spirit and scope of the appended claims.

As previously stated, the phrase "contractional spring" as used throughout the specification, including the appended claims, defines or covers any spring which contracts in size or occupies less space as loaded, and the phrase "eccentric cam" as used throughout the appended claims, defines or covers both a true eccentric cam, such as shown in Figs. 2 to 7, and a substantially eccentric cam, such as shown in Figs. 13, 14 and 15.

Having thus described our invention, what we claim is:

1. In a counterpoise for a parallel motion mechanism of the wheel and band type having a strut member and a band-engaging wheel member operatively connected together for relative rotation about the center of the wheel member, a cam having a curved cam surface, means for operatively connecting said cam to one of said members for adjustment of its cam surface eccentrically of the center of said wheel member, a counterpoise force producing means, means for operatively connecting said counterpoise force producing means to said member other than the member to which the cam is adjustably connected, and means for operatively connecting said counterpoise force producing means to said cam surface, said first-named means comprising a movable member operatively connected to said cam for moving said cam relative to the member to which it is adjustably connected whereby the counterpoising effect of said force producing means may be varied.

2. In a counterpoise for a parallel motion mechanism of the wheel and band type having a strut member and a band-engaging wheel member operatively connected together for relative rotation about the center of the wheel member, a cam having a circular cam surface, means for operatively connecting said cam to one of said pivoted strut and wheel members for adjustment of its cam surface eccentrically of their pivotal axes, a counterpoise force producing means enclosed within the parallel motion mechanism, means for operatively connecting said counterpoise force producing means to said pivoted member other than the member to which the cam is adjustably connected, and means for operatively connecting said counterpoise force producing means to said cam surface, said first-named means comprising a movable member operatively connected to said cam for moving said cam relative to said pivoted member to which it is adjustably connected whereby the counterpoising effect of said force producing means may be varied.

3. In a counterpoise for a parallel motion mechanism of the wheel and band type having a strut member and a band-engaging wheel member operatively connected together for relative rotation about the center of the wheel member, a cam having a circular cam surface, means for operatively connecting said cam to one of said pivoted strut and wheel members for adjustment of its cam surface eccentrically of their pivotal axes, a counterpoise force producing torsion or coil spring, means for operatively connecting said counterpoise force producing means to said pivoted member other than the member to which the cam is adjustably connected, and means for operatively connecting said counterpoise force producing means to said cam surface, said first-named means comprising a movable member operatively connected to said cam for moving said cam relative to said pivoted member to which it is adjustably connected whereby the counterpoising effect of said spring may be varied.

4. In a counterpoise for a parallel motion mechanism of the wheel and band type having a strut member and a band-engaging wheel member operatively connected together for relative rotation about the center of the wheel member, a cam having a circular cam surface, means for operatively connecting said cam to one of said pivoted strut and wheel members for adjustment of its cam surface eccentrically of their pivotal axes, a counterpoise force producing spring enclosed within the parallel motion mechanism, means for operatively connecting said counterpoise force producing means to said pivoted member other than the member to which the cam is adjustably connected, and means for operatively connecting said counterpoise force producing means to said cam surface, said first-named means comprising a movable member operatively connected to said cam for moving said cam relative to said pivoted member to which it is adjustably connected whereby the counterpoising effect of said spring may be varied.

5. In a counterpoise for a parallel motion mechanism of the wheel and band type having a strut member and a band-engaging wheel member operatively connected together for relative rotation about the center of the wheel member, a cam member, a ring-like member rotatably carried by said cam member by antifriction bearings, means for operatively connecting said cam member to one of said pivoted strut and wheel members for adjustment eccentrically of their pivotal axes, a counterpoise force producing means, means for operatively connecting said counterpoise force producing means to said pivoted member other than the member to which the cam is adjustably connected, and means for operatively connecting said counterpoise force producing means to said ring-like member, said first-named means comprising a movable member operatively connected to said cam for moving said cam member relative to said pivoted member to which it is adjustably connected whereby the counterpoising effect of said force producing means may be varied.

6. In a counterpoise for a parallel motion mechanism of the wheel and band type having a strut member and a band-engaging wheel member operatively connected together for relative rotation about the center of the wheel member, a cam member, a ring-like member rotatably carried by said cam member by antifriction bearings, means for operatively connecting said cam member to one of said pivoted strut and wheel members for adjustment eccentrically of their pivotal axes, a counterpoise force producing spring enclosed within the parallel motion mechanism, means for operatively connecting said counterpoise force producing spring to said pivoted member other than the member to which the cam member is adjustably connected, and means for operatively connecting said counterpoise force producing spring to said ring-like member, said first-named means comprising a movable member operatively connected to said cam for moving said cam member relative to said pivoted member to which it is adjustably connected whereby the counterpoising effect of said force producing spring may be varied.

7. In a counterpoise for a parallel motion mechanism of the wheel and band type having a strut member and a band-engaging wheel member operatively connected together for relative rotation about the center of the wheel member, a cam having a curved cam surface, means for operatively connecting said cam to one of said members for adjustment of its cam surface eccentrically of the center of said wheel member, a counterpoise force producing means, means for operatively connecting said counterpoise force producing means to said member other than the member to which the cam is adjustably connected, means for operatively connecting said counterpoise force producing means to said cam surface, said first-named means comprising a movable member operatively connected to said cam for moving said cam relative to the member to which it is adjustably connected whereby the counterpoising effect of said force producing means may be varied, and means for indicating the inclination for which the counterpoise is adjusted.

8. In a counterpoise for a parallel motion mechanism of the wheel and band type having a strut member and a band-engaging wheel member operatively connected together for relative rotation about the center of the wheel member, a cam member, a ring-like member rotatably carried by said cam member by antifriction bearings, means for operatively connecting said cam member to one of said pivoted strut and wheel members for adjustment eccentrically of their pivotal axes, a force producing spring enclosed within the parallel motion mechanism, means for operatively connecting said counterpoise force producing means to said pivoted member other than the member to which the cam member is adjustably connected, means for operatively connecting said counterpoise force producing spring to said ring-like member, said first-named means comprising a movable member operatively connected to said cam for moving said cam member relative to said pivoted member to which it is adjustably connected whereby the counterpoising effect of said force producing spring may be varied, and means for indicating the inclination for which the counterpoise is adjusted.

9. In a counterpoise for a parallel motion mechanism of the wheel and band type having a strut member and a band-engaging wheel member operatively connected together for relative rotation about the center of the wheel member, a cam having a curved cam surface, means for operatively connecting said cam to one of said pivoted strut and wheel members, a counterpoise force producing means, means including a lever interposed between said cam surface and said force producing means for operatively connecting said cam and said force producing means and increasing the force applied to said cam over that of said force producing means, and means for operatively connecting said force producing means to said pivoted member other than the one to which the cam is connected.

10. In a counterpoise for a parallel motion mechanism of the wheel and band type having a strut member and a band-engaging wheel member operatively connected together for relative rotation about the center of the wheel member, a cam having a curved cam surface, means for operatively connecting said cam to one of said pivoted strut and wheel members, a counterpoise force producing means, means including a lever interposed between said cam surface and said force producing means for operatively connecting said cam and said force producing means and changing the direction of the force of said force producing means, and means for operatively connecting said force producing means to said pivoted member other than the one to which the cam is connected.

11. In a counterpoise for a parallel motion mechanism of the enclosed wheel and band type having a strut member and a band-engaging wheel member operatively connected together for relative rotation about the center of the wheel member, a cam having a curved cam surface, means for operatively connecting said cam to one of said pivoted strut and wheel members, a counterpoise force producing means, means including a lever interposed between said cam surface and said force producing means for operatively connecting said cam and said force producing means and changing the amount and direction of the force of said force producing means, and means for operatively connecting said force producing means to said pivoted member other than the one to which the cam is connected.

12. In a counterpoise for a parallel motion mechanism of the enclosed wheel and band type having a strut member and a band-engaging wheel member operatively connected together for relative rotation about the center of the wheel member, a cam having a curved cam surface, means for operatively connecting said cam to one of said pivoted strut and wheel members, a counterpoise force producing means enclosed within the parallel motion mechanism, means enclosed within the parallel motion mechanism and including a lever interposed between said cam surface and said force producing means for operatively connecting said cam and said force producing means and changing the amount and direction of the force of said force producing means, and means for operatively connecting said force producing means to said pivoted member other than the one to which the cam is connected.

13. In a counterpoise for a parallel motion mechanism of the wheel and band type comprising a strut member and a band wheel member pivotally connected together for rotation about the center of the wheel member, a counterpoise force producing means, means for operatively connecting said counterpoise force producing means to said wheel member, a cam having a curved cam surface, means for connecting said cam to said strut member, said last-named means including a readily accessible member operatively connected to said cam for moving said cam relative to said strut member transversely of the axis of relative rotation between said strut and wheel members, and means for operatively connecting the counterpoise force producing means to said cam.

14. A parallel motion mechanism of the wheel and band type comprising a strut member and a band wheel member pivotally connected together for rotation about the center of the wheel member, a counterpoise force producing means, means for operatively connecting said counterpoise force producing means to said wheel member, a cam having a curved cam surface, means for connecting said cam to said strut member, said last-named means including a readily accessible member movably supported by said strut member and operatively connected to said cam for moving said cam relative to said strut member transversely of the axis of relative rotation between said strut and wheel members, and means for operatively connecting the counterpoise force producing means to said cam.

15. A parallel motion mechanism of the wheel and band type comprising a strut member and a band wheel member pivotally connected together for rotation about the center of the wheel member, a counterpoise force producing means, means for operatively connecting said counterpoise force producing means to said wheel member, a cam having a curved cam surface, means for connecting said cam to said strut member, said last-named means including a member having threaded engagement with said strut member and projecting to the exterior thereof and operatively connected to said cam for moving said cam relative to said strut member transversely of the axis of relative rotation between said strut and wheel members, and means for operatively connecting the counterpoise force producing means to said cam.

16. A parallel motion mechanism of the wheel and band type comprising a strut member and a band wheel member pivotally connected together for rotation about the center of the wheel member, a counterpoise force producing spring enclosed within said strut and wheel members, means for operatively connecting said counterpoise force producing spring to said wheel member, a cam having a curved cam surface and enclosed within said strut and wheel members, means for connecting said cam to said strut member, said last-named means including a member having threaded engagement with said strut member and projecting to the exterior thereof and operatively connected to said cam for moving said cam relative to said strut member transversely of the axis of relative rotation between said strut and wheel members, and means for operatively connecting the counterpoise force producing spring to said cam.

17. A parallel motion mechanism of the wheel and band type comprising a strut member and a band wheel member pivotally connected together for rotation about the center of the wheel member, a cam having a curved cam surface, means for operatively connecting said cam to said strut member, a counterpoise force producing means, means for operatively connecting said counterpoise force producing means to said wheel member, a lever member pivotally connected to said wheel member, means for operatively connecting said lever member to said cam, and means for operatively connecting said counterpoise force producing means to said lever member at a point different from that at which said last-named means is connected thereto.

18. A parallel motion mechanism of the wheel and band type comprising a strut member and a band wheel member pivotally connected together for rotation about the center of the wheel member, a cam having a curved cam surface, means for operatively connecting said cam to said strut member, said last-named means including a member having threaded engagement with said strut member and projecting to the exterior thereof and operatively connected to said cam for moving said cam relative to said strut member transversely of the axis of relative rotation between said strut and wheel members, a counterpoise force producing means, means for operatively connecting said counterpoise force producing means to said wheel member, a lever member pivotally connected to said wheel member, means for operatively connecting said cam to said pivoted lever member, and means for operatively connecting said counterpoise force producing means to said pivoted lever member at a point different from that at which said last-named means is connected thereto.

CHARLES HENRY LITTLE.
CHARLES HUBBARD LITTLE.

REFERENCES CITED

The following references are of record in the file of this patent:

UNITED STATES PATENTS

| Number | Name | Date |
|---|---|---|
| 1,003,765 | Little | Sept. 19, 1911 |
| 1,843,424 | Husy | Feb. 2, 1932 |
| 2,164,216 | Little | June 27, 1939 |
| 2,228,140 | Little | Jan. 7, 1941 |
| 2,256,445 | Wiedemann | Sept. 16, 1941 |
| 2,316,485 | Langsner | Apr. 13, 1943 |
| 2,350,358 | Keuffel | June 6, 1944 |
| 2,362,050 | Cole | Nov. 7, 1944 |
| 2,374,020 | Ketting | Apr. 17, 1945 |

FOREIGN PATENTS

| Number | Country | Date |
|---|---|---|
| 503,102 | Great Britain | Mar. 31, 1939 |
| 596,648 | Germany | May 9, 1934 |